Dec. 29, 1970   B. F. WATSON, JR., ET AL   3,550,270
PROCESS OF MAKING NIPPLE-ELECTRODE ASSEMBLY AND JOINT
Filed July 2, 1968   3 Sheets-Sheet 1
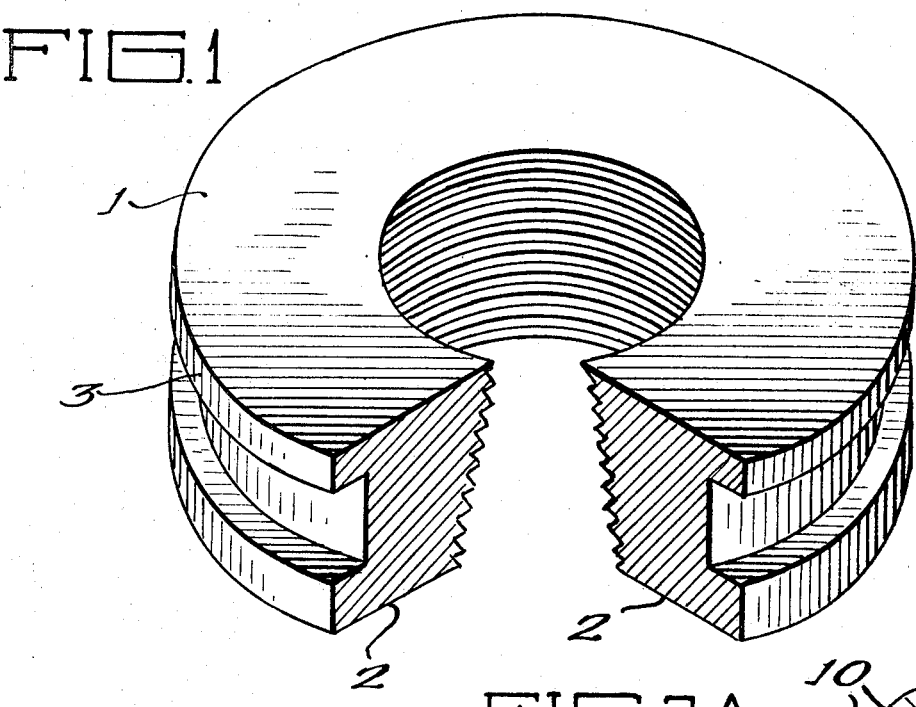
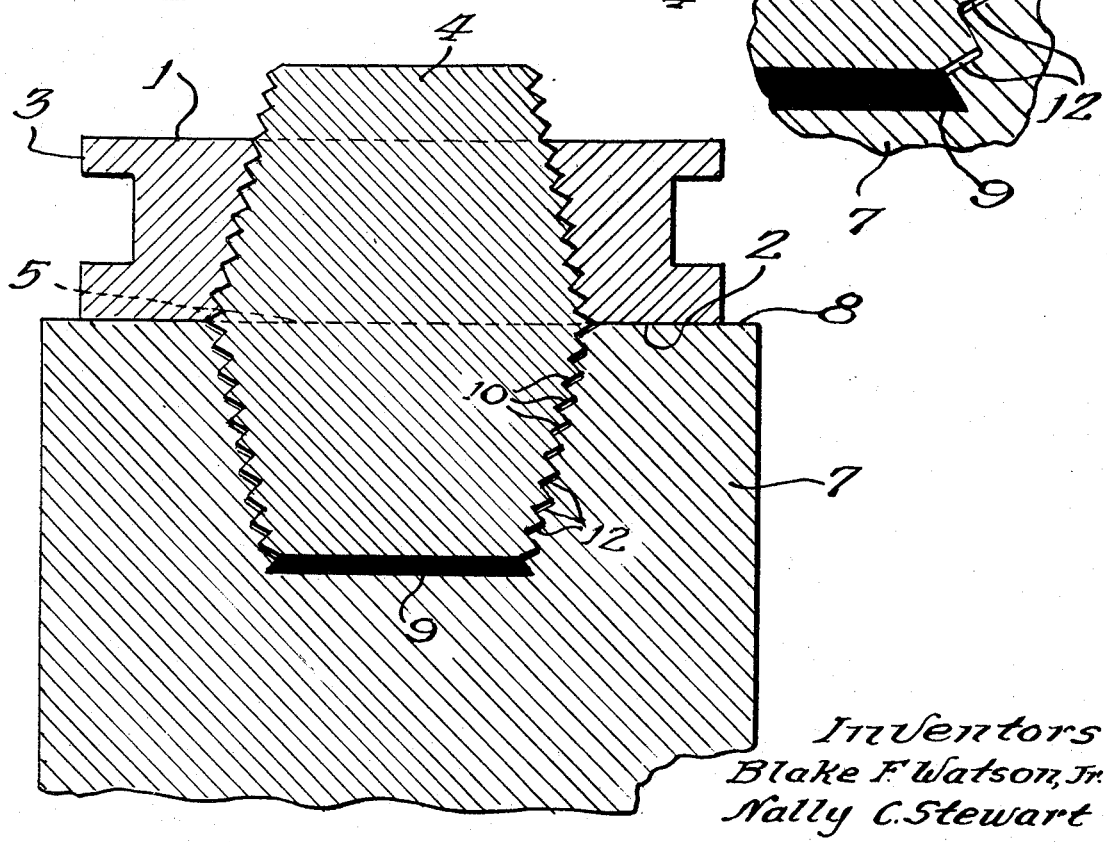
Inventors
Blake F Watson, Jr.
Nally C. Stewart United States Patent Office 3,550,270
Patented Dec. 29, 1970

3,550,270
PROCESS OF MAKING NIPPLE-ELECTRODE
ASSEMBLY AND JOINT
Blake F. Watson, Jr., Youngstown, N.Y., and Nally C.
Stewart, Morganton, N.C., assignors to Great Lakes
Carbon Corporation, New York, N.Y., a corporation
of Delaware
Filed July 2, 1968, Ser. No. 741,927
Int. Cl. H01r 43/00
U.S. Cl. 29—628                               11 Claims

ABSTRACT OF THE DISCLOSURE

The invention relates to a process of distributing thread clearance between nipple-electrode section assemblies and joints, such as those used in electric furnaces. The nipples used are threaded and double frusto-conical and the electrode sections used contain tapered threaded sockets which correspond to the ends of the nipple. The process includes the use of an internally threaded ring which has a plane surface, or which is constructed in such a manner as to define a plane surface perpendicular to its axis. The ring is threaded onto the outside of the tapered threaded nipple to a position such that when the nipple with the ring attached is threaded into the socket of the electrode section, until the plane surface of the ring contacts the face of the electrode section, a clearance is provided between the non-load bearing flanks of the threads of the nipple and said threaded electrode socket. The aforesaid thread clearance results when the ring is hand-tightened onto the nipple and when the nipple with the ring attached is hand-tightened into the socket of the electrode section. The aforesaid clearance between the threads is maintained by locking the nipple in position in the electrode socket before unthreading the ring from the nipple.

BACKGROUND OF THE INVENTION (1) Field of the invention

This invention relates to the field of graphite or other carbon electrodes for electric furnaces and like equipment, wherein the electrodes are consumed in use and wherein the electrodes must be continually fed into the furnace or other equipment where they are used.

In order to facilitate this continual feed, the electrode sections are suitably bored and threaded at each end to provide juncture means through a nipple. In this manner, a new electrode is joined to the one being consumed by inserting a nipple into the bore of either the new or partially consumed electrode section and joining the composite electrode section-nipple assembly to the other electrode section. Such nipples and their corresponding bore holes in the electrode sections may have threaded sides which are parallel to the nipple axis. It is generally more customary and advantageous, however, to taper the nipple so that its largest diameter is at its middle and is also at the plane of contact between the electrode sections. In the present invention, the use of a tapered or double-frusto-conical nipple and tapered sockets is essential. Such a tapered, double-frusto-conical nipple is screwed into place in a correspondingly tapered threaded bore or frusto-conically, cup-shaped socket of the electrode section, with the small diameter end or nipple base going furthest into the electrode body. In threading the tapered nipples for use in joining electrode sections, the thread depth is generally the same whether measured at the small diameter ends or bases or at the large diameter center. It is also usual that in the assembled joint each thread will possess a loaded flank, which is nearer the geometric center of the nipple, and a non-load bearing or idle flank which is opposite to the loaded flank. (That is, the *idle* flank *nearer* the *ends* of the nipple and the *loaded* flank is the flank *nearer* the *geometric center* of the nipple, and this is how these flanks are defined in the present invention.) The loaded flank generally carries most, if not all, of the stress between the nipple and the electrode sections.

In this type of joint, the half that is assembled first usually contains little or no clearance at the non-load bearing or idle flank while maximum clearance occurs at the idle flank of the second half assembled.

Such electrode joints are generally mechanically weaker than the full-bodied portions of the electrodes. The joints are therefore particularly susceptible to breaking and are also subjected to additional stresses by thermal tensions occurring during heating and/or cooling and shrinking of the electrodes. The high current loading of modern electro-furnaces causes additional stresses by overheating in the nipple portion at the junction places between the nipple and the electrode sockets. All such thermal stresses are particularly critical with electrodes of large diameters, and in electric furnaces operating at very high voltages as are used for reducing the melting-in period and increasing the furnace capacity.

(2) Description of the prior art

There has been a well recognized need to more evenly distribute the aforedescribed clearance differences in order to reduce or counteract thermal stresses which build up due to lack of expansion room and result in cracking of the joint, and various methods have been proposed by those skilled in the art to accomplish substantially even distribution of thread clearance. For example, this problem and several proposed solutions for same are discussed in United States patents: 2,970,854; 2,957,716; 3,088,716; 3,134,616; 3,140,967, and also in German Pat. 1,091,253. The present invention also relates to and is concerned with a more even distribution of clearance between the threads of the nipple and the electrode sockets and consequent reduction in thermal stresses between a nipple and the electrode sections into which it is threaded and offers a novel and advantageous approach for accomplishing this.

SUMMARY OF THE INVENTION

It is an object of the present invention to provide a tapered nipple-electrode section assembly in which there is a more evenly distributed clearance (as compared to conventional commercial practices) between the idle or non-load bearing flanks of the threads of the nipple and the threads of the electrode section socket, so as to provide room for thermal expansion of said threads.

It is another object of this invention to substantially evenly distribute thread clearance throughout a tapered nipple-electrode section assembly, and also throughout an entire electrode joint assembly comprising two electrode sections having tapered threaded sockets in the ends thereof and a tapered, double-frusto-conical nipple threaded into said sockets, joining the electrode sections together.

It is another object of this invention to accomplish the aforesaid more even distribution of thread clearance in an advantageous and practcial manner which is also novel as compared to techniques which have been suggested or taught by the prior art for solving this problem.

The invention, in a preferred embodiment, comprises the making of an improved double-frusto-conical, threaded nipple-electrode section assembly or connection such as just discussed which includes the step of threading the nipple into the socket, by:

(A) Threading onto the tapered threaded nipple a corresponding internally threaded ring having a plane surface, to a position such that when the nipple with the ring attached is threaded into the socket of the electrode section until the plane surface of the ring contacts the face of the electrode section, a clearance is provided between the non-load bearing flanks of the threads of said nipple and said threaded electrode socket;

(B) Locking the nipple in the postion defined in (A) in the socket of the electrode section; and (C) Unthreading the ring from the nipple while leaving the nipple in the locked position described in (B).

The invention embraces not only the process of making the aforesaid assembly or connection but also the step of coupling a second electrode-section to the improved nipple-electrode section assembly by threading another internally threaded electrode section onto the threads of the nipple which are still exposed until the faces of the electrode sections contact each other, thereby also providing substantially even distribution of clearance between the threads of said nipple and the threads of the electrode sections in the final joint assembly.

Other objects, and coincident advantages, and a complete understanding of the invention will be apparent to those skilled in the art after a study of the drawings, and a reading of the specification and claims.

BRIEF DESCRIPTION OF THE DRAWINGS

It has been found that the foregoing objects are achievable by making an internally threaded ring having a plane surface such as illustrated in FIG. 1; threading this ring onto the tapered threaded nipple to a position as illustrated in the upper part of FIG. 2; threading the nipple, with the ring attached, into the socket of an electrode section until the plane surface of the ring contacts the face of the electrode section as illustrated in FIG. 3; locking the nipple in position in the socket of the electrode section (by a technique such as discussed in reference to FIG. 3A); and thereafter unthreading the ring from the nipple, leaving the nipple centered and locked in the electrode section as illustrated in FIG. 4 and the assembly in an eminently satisfactory condition for the coupling of a second electrode section to same.

DETAILED DESCRIPTION OF THE DRAWINGS AND OF THE PREFERRED EMBODIMENTS

Figure 2:
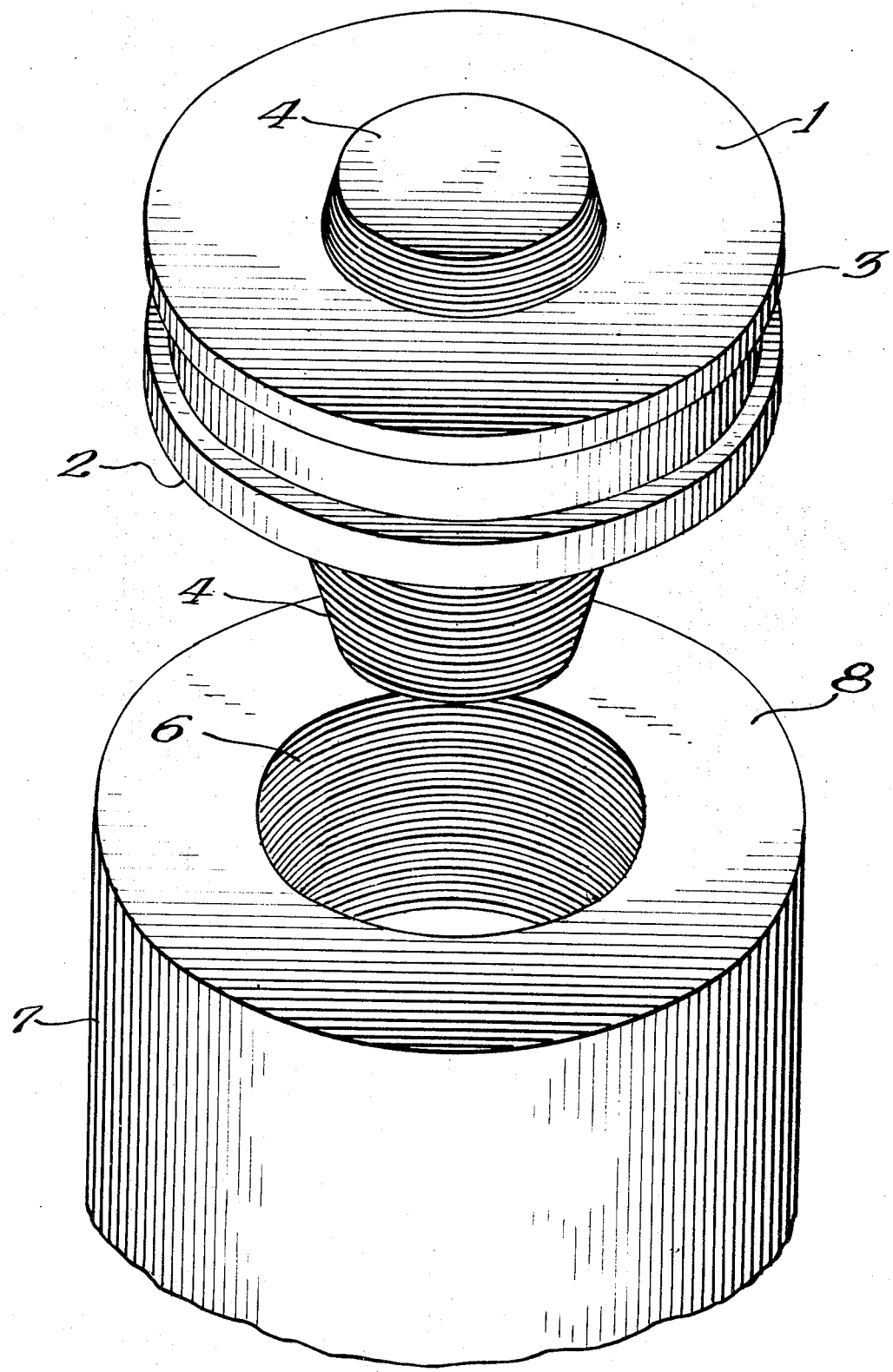

As illustrated in FIG. 1, a ring 1 (shown in cutaway section) is made of a material such as metal or graphite which can be precision machined to desired dimensions and threaded to close tolerances. The ring is of substantial thickness so as to provide the necessary rigidity for for maintaining an accurate plane surface 2 on its underside, and so as to provide a sufficient number of internal threads of the desired taper and pitch to maintain a position of axial coincidence with the nipple onto which it is to be threaded. The outside 3 of the ring can be of any size or shape, such as flanged as illustrated, or square, etc., as might be convenient for handling (when it is hand-tightened onto the nipple as illustrated at the top of FIG. 2, when the nipple with the ring attached is threaded into the electrode section socket as illustrated in FIG. 3, and when the ring is unthreaded from the nipple). The rigid plane surface 2 of the ring that makes contact with the electrode face must be machined flat and perpendicular to the longitudinal axis of the ring, or must be constructed in such a manner as to define a plane surface perpendicular to the axis. (In other words, plane surface 2 need not necessarily be continuous and may, for example, be interrupted with indentations.) In the illustrated embodiment the ring is for use with a tapered, double frusto-conical nipple having a length of 14 inches, a major diameter of 10¾ inches, a pitch of one-third, and a taper of 1 to 6, i.e. its radius decreased by one inch for every six inches of length of the nipple away from the maximum diameter. This nipple is for coupling electrode sections of 20 inch diameter. The ring has a thickness of about 5 inches and its maximum outer diameter is about 18 inches. As a guide for those skilled in the art, more is stated hereinafter regarding proper threading for nipples and matching rings for joining electrodes, and how it is determined.

In the top of FIG. 2 the ring has been threaded onto the outside of nipple 4 and there is substantially complete thread engagement between the ring and the nipple. The ring is so dimensioned that when it is hand-tightened about the nipple, and the resulting ring-nipple assembly is threaded into the electrode section socket, the thread diameter 5 of the nipple at its mid-length, will be located at the plane surface 2 of the ring, or the plane surface 8 of the electrode socket section (see FIG. 3). A further requirement of the aforedescribed arrangement is that the load bearing flanks 11 of the nipple be brought into contact with the mating threads of the electrode socket section and that a clearance 12 (see FIG. 3A) be created between the non-load bearing flanks 10 of the threads of the nipple and the threads of the electrode section socket.

Also in carrying out this illustrated embodiment of the invention, additional steps have to be undertaken to properly center the nipple in the socket 6 of an electrode section 7. These include the precision machining and threading of the electrode socket and the precision machining of the face 8 of the electrode section 7 so as to insure that it also is flat, and that the threads and taper of the socket correspond to the threads and taper of the nipple. Other steps are also typically taken to insure an optimum connection and distribution of thread clearance including the air-blowing of the socket 6 while the electrode section 7 is in a horizontal position so as to remove any dust or particles which may have deposited on the threads and which might interfere with the obtaining of the thread clearances desired.

Figure 4:
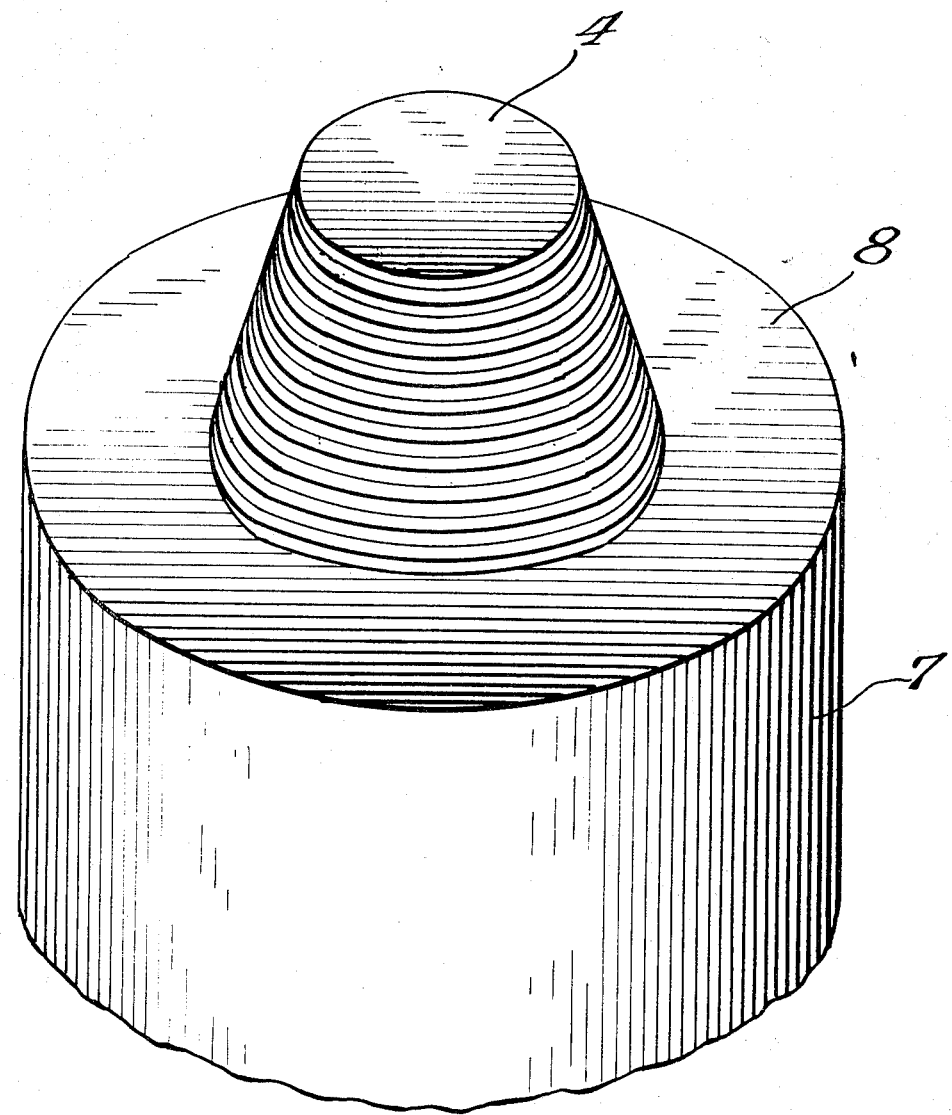

The "locking" of the nipple in position in the socket of the electrode section is preferably effected in the present invention by the use of a foamable material 9 (see FIGS. 3 and 3A) which quickly expands and "sets" to a rigid condition. When this type of "locking" technique is used, predetermined amounts of the ingredients of the foamable material are mixed, and a few drops of catalyst are added to same. The mixture is then immediately transferred to the bottom of the socket 6 of the electrode section, care being taken to avoid spillage onto the socket threads. The nipple with the ring hand-tightened about same (top of FIG. 2) is then inserted into the socket and quickly screwed down until the underface or plane surface 2 of the ring has made hand-tight face-to-face contact with the end-face 8 of the electrode section. This condition is illustrated in FIG. 3. Within a matter of minutes the foam expands, substantially fills the cavity or space between the base of the nipple 4 and the base or bottom of the electrode section socket and becomes substantially rigid and locks the nipple in position in the socket of the electrode section, thereby also maintaining the aforedescribed thread clearance 12 between the non-load bearing flanks 10 of the threads of the nipple and the corresponding threads of the electrode section socket. The ring is then unthreaded from the nipple for use in making another assembly, leaving the nipple in the locked position in the electrode section socket as illustrated in FIG. 4. This position is eminently suitable for threading a second internally threaded electrode section onto the threads of the nipple which are still exposed until the faces of the electrode sections contact each other, thereby also providing substantially even distribution of clearance between the threads of said nipple and the threads of the electrode sections in the final joint assembly.

Where a foaming resin system is used to lock the nipple in position, the conditions required for achieving the desired performance of the foamable resin would be dependent upon the specific character of the resin employed, the foaming agent used, catalyst concentration and temperature. The exact definition of these conditions is a matter of experiment. It is sometimes necessary and even desirable to pre-heat the nipple and/or insulate the foamable resin from the base of the socket of the electrode section in order to achieve the necessary state of rigidity in the resin within a reasonable time. A suitable means for thermally insulating the foamable resin from the socket base is a thin layer of shredded polyurethane foam or a thin wafer (e.g. ³⁄₃₂″) of polyurethane foam. In those instances where the nipple is pre-heated it is necessary to take into consideration in the dimensioning of the ring the expansion characteristics of the material from which it is machined in order to provide the desired thread clearance in the final assembly.

Inspection of such 20 inch diameter electrode joints, as described hereinbefore, after sectioning has shown uniform clearances at the nipple threads in both sockets, typical clearances being as follows:

Lower socket—left quadrant 0.013″
Lower socket—right quadrant 0.013″
Upper socket—left quadrant 0.013″
Upper socket—right quadrant 0.014″

Based on measurements of this nature it was considered that the assembly procedure outlined yields an excellently balanced nipple assembly.

Proper dimensioning of the ring is a simple engineering calculation for anyone skilled in the art. A simplified method to determine the threading of the ring needed to properly "locate" the tapered nipple in the socket of the electrode section is based upon the principle that:

The pitch diameter of the spacer ring face (face with the largest opening) should be equal to the pitch diameter of the nipple at its mid-length.

There are several materials which expand upon solidification and which may be used in the space 9 between the base of the nipple and the base of the electrode section socket in the present invention in order to maintain the nipple in the preferred position in the electrode socket. Such materials include foaming resins which expand and become substantially rigid upon foaming. Most of these are made by mixing the foamable material with a catalyst and/or foaming agent just before introducing the mixture into the aforesaid space. Such foamable resin materials which become substantially rigid upon setting include polyurethane, polystyrene and polyvinyl chloride resin formulations well known to those skilled in the art of making rigid plastic foams.

The nipple may also be locked or fixed permanently in position in the socket of the electrode section in several other ways such as by providing or drilling one or more transverse holes in the electrode section socket wall and injecting a suitable cement or paste or binder in said holes and allowing or causing said materials to set so as to "lock" the nipple in place. Such hole or holes would lead to the space between the base of the nipple and the bottom of the electrode socket. Or locking pins may be inserted or driven through radial holes so as to exert a mechanical locking action against the nipple, so as to maintain the nipple in a fixed position in the electrode socket of the assembly, with the idle flanks of the threads of the nipple separated from the opposing flanks of the threads in the electrode socket. Or one or more lengthwise holes may be used in the nipple, and a filling substance may then be injected through the hole(s) to fill the space between the base of the nipple and the bottom of the electrode socket. The "filling substance" need not be expandable, just so long as enough of it is injected into the space while the nipple is in the position established in FIG. 3 so that when the centering ring is removed, the nipple is maintained in its fixed position.

Following are some of the features or benefits and advantages which can be attained by proceeding in accordance with the present invention and by making or employing a nipple-electrode section pre-assembly in a manner such as just described:

(1) The connecting nipple can be centered or "floated" in one of the electrode sections in the plant of the manufacturer. That is, it can be made in such a manner as to provide a clearance between the non-load bearing flanks of the threads of the connecting nipple and the threads of the socket of the electrode section of the pre-assembly. The nipple remains in this assembled form in the electrode section with the aforedescribed thread clearance and the pre-assembly is shipped to the customer. The possibility of the condition of the assembled form being changed or of the nipple becoming loose in transit or when the pre-assembly is connected to the electrode train of the furnace is eliminated by using a paste or cement or a locking substance or some other means as part of the pre-assembly to maintain the nipple in the fixed floating, centered position in the socket of the electrode with the aforedescribed thread clearance. A primary advantage of proceeding in this manner is that *the assembly of an improved electrode joint is made more reproduceable* as compared to prior art techniques because a vital part of its total assembly is carried out under closely controlled conditions rather than by those at the plant of the user of the joint who may not appreciate the problems involved in centering the nipple and the disadvantages which can result if the nipple is not properly centered.

(2) Because of conditions at the site of where the joint is used, it is very difficult to make a good joint in which the nipple is properly centered at such site. Usually the customer or user of the electrode sections and connecting nipples makes a non-floating pre-assembly at the plant so as to have it ready in case of breakage or major butt losses, etc., in the electrode train of the furnace, such breakage and/or losses often occurring daily in some steel furnace plants. The said non-floating pre-assembly does not provide the optimum positioning of the nipple as described herein and it may also be on the floor for any length of time, even a day or longer during which time it is typically unprotected. Dust or particles can collect on or in the threads of the pre-assembly, and the threads or faces of same can also be bumped or damaged, etc., because of the exposed condition of the pre-assembly. Foreign objects on the threads of the joint, or damaged threads, are, of course, very detrimental to the making of optimum joints and/or to optimum joint performance. In the case of the present invention, a floating pre-assembly has already been made for the customer and end protectors can be left on until the last minute because they can be removed very quickly. In other words, there is no longer any concern on the part of the customer of the time required to take nipples and electrode sections out of separate boxes or crates and to make a pre-assembly as there is under the usual former practices. Under former practices, this time element is also, of course, of great concern because it can cause furnace "down-time" and consequent production losses and this is the reason why the customer typically made one or more pre-assemblies in order to try to avoid or minimize such furnace "down-time."

(3) Pre-assembly at the plant of the manufacturer or prior to shipment to the user more readily permits the selection of the proper class or type of nipple to correspond with the electrode. The relative values of the coefficients of thermal expansion (CTE's) of the nipple and of the electrode sections connected by the nipple are very important for proper or optimum joint design and performance, but knowledge of these values is much more within the province of the manufacturer or supplier than it is to the user, who may be entirely unaware of these factors at the time he makes the joint connections. The foregoing considerations apply also, but to a lesser degree, to such relative properties of the nipple and electrode sections as strength and resistivity, which should also be intelligibly matched with a proper consideration of their values in order to insure the making of optimum joints.

The possibility, therefore, of the customer or the user of the joint using nipples which do not match well with the electrodes, or vice versa, is eliminated or reduced;

(4) The customer or user of the joint is provided with a labor-saving inasmuch as half of his customary assembling operation is eliminated and he is not required to assemble a free nipple into one of the electrodes. Rather, the customer joins one nipple, electrode-section pre-assembly to another such pre-assembly (which may already be on the furnace) or to another electrode section, such as to the last electrode section of the electrode train of the furnace. The cost-saving to the customer varies, therefore, depending on whether the customer made assemblies on the floor or on the furnace. Regardless of which method he uses, the employment of the pre-assembly of the present invention provides a labor-savings.

It is to be understood that the invention is not limited to the specific details which have been offered merely for illustrative purposes and that modifications may be made within the scope of the appended claims without departing from the spirit of the invention.

We claim:

1. In the process of making a connection between a double frustoconical threaded nipple and an electrode section containing a tapered threaded socket corresponding to one end of the nipple which includes the step of threading the nipple into the socket, the improvement which comprises:
   (A) threading onto one end of the tapered threaded nipple a correspondingly internally threaded ring, having a plane end surface, and then threading the other tapered threaded end of the nipple into the socket of the electrode section until the plane end surface of the ring contacts the face of the electrode section and to a position where the load bearing flank of the threads of said nipple and the threads of said electrode socket are in engagement and a clearance is provided between the non-load bearing flanks of the threads of said nipple and said threaded electrode socket;
   (B) locking the nipple in the position defined in (A) in the socket of the electrode section; and
   (C) unthreading the ring from the nipple while leaving the nipple in the locked position described in (B).

2. A process according to claim 1 wherein the thread clearance of step (A) results when the ring is hand-tightened onto the nipple and when the nipple with the ring attached is hand-tightened into the socket of the electrode section.

3. A process according to claim 1 wherein the ring is constructed in such a manner as to define a plane surface perpendicular to its axis.

4. A process according to claim 1 wherein the nipple is locked in the fixed position in the socket of the electrode section by means of a material which expands upon solidification and which has been placed in the bottom of the socket of the electrode section before the nipple with the ring attached has been threaded therein, and which has solidified before the ring has been unthreaded from the nipple.

5. A process according to claim 4 wherein the material which expands upon solidification is a polyurethane foamable material.

6. A process according to claim 5 wherein the nipple which is threaded into the socket is pre-heated and wherein a thermal insulation means is placed in the bottom of the socket before the foamable material is added and before the nipple is threaded into the socket.

7. In the process of assembling an electrode joint comprising a double frusto-conical threaded nipple and two electrode sections containing tapered threaded sockets corresponding to the ends of the nipple, which includes the step of threading the nipple into the socket of one of the electrodes before the other electrode is connected to the nipple, the improvement which comprises:
   (A) threading onto one end of the tapered threaded nipple a corresponding internally threaded ring, having a plane end surface, and then threading the other tapered threaded end of the nipple into the socket of one of the electrode sections until the plane end surface of the ring contacts the face of the electrode section and to a position where the load bearing flank of the threads of said nipple and the threads of said electrode socket are in engagement and a clearance is provided between the non-load bearing flanks of the threads of said nipple and said threaded electrode socket;
   (B) locking the nipple in the position defined in (A) in the socket of the electrode section;
   (C) unthreading the ring from the nipple while leaving the nipple in the locked position described in (B); and
   (D) threading the other electrode section onto the threads of the nipple which are still exposed until the faces of the electrode sections contact each other, thereby also providing substantially even distribution of clearance between the threads of said nipple and the threads of the electrode sections in the final joint assembly.

8. A process according to claim 7 wherein the thread clearance of step (A) results when the ring is hand-tightened onto the nipple and when the nipple with the ring attached is hand-tightened into the socket of the electrode section.

9. A process according to claim 7 wherein in step (B) the nipple is locked in the fixed position in the socket of the electrode section by means of a material which expands upon solidification and which has been placed in the bottom of the socket of the electrode section before the nipple with the ring attached has been threaded therein, and which has solidified before the ring has been unthreaded from the nipple.

10. A process according to claim 9 wherein the material which expands upon solidification is a polyurethane foamable material.

11. A process according to claim 10 wherein the nipple which is threaded into the socket of one of the electrode sections is pre-heated and wherein a thermal insulation means is placed in the bottom of the socket before the foamable material is added and before the nipple is threaded into the socket.

References Cited

UNITED STATES PATENTS

| | | | |
|---|---|---|---|
| 2,510,230 | 6/1950 | Johnson et al. | 287—127(E) |
| 2,744,945 | 5/1956 | Johnson | 287—127(E)X |
| 3,048,433 | 8/1962 | Doetsch | 287—127(E) |
| 3,048,434 | 8/1962 | Johnson et al. | 287—127(E) |
| 3,055,789 | 9/1962 | Gemmi | 29—628X |
| 3,084,419 | 4/1963 | Doetsch et al. | 29—628 |
| 3,140,967 | 7/1964 | Kaufmann et al. | 156—91 |

CHARLIE T. MOON, Primary Examiner

U.S. Cl. X.R.

29—458, 464, 470.5, 526; 156—91; 287—127